United States Patent [19]

Alexander et al.

[11] 4,188,627

[45] Feb. 12, 1980

[54] DISPLAY APPARATUS

[75] Inventors: Alfred J. Alexander; David J. Jibb; Graham Hollaway, all c/o Century Works, Lewisham, London, SE. 13, England

[73] Assignee: Elliott Brothers (London) Limited, Essex, England

[21] Appl. No.: 238,962

[22] Filed: Mar. 28, 1972

Related U.S. Application Data

[63] Continuation-in-part of Ser. No. 37,201, May 14, 1970, abandoned.

[30] Foreign Application Priority Data

May 14, 1969 [GB] United Kingdom ............... 24653/69
Dec. 24, 1969 [GB] United Kingdom ............... 62816/69

[51] Int. Cl.[2] ............................................ G06K 15/20

[52] U.S. Cl. .................................... 340/747; 340/791; 315/364; 340/728; 364/521

[58] Field of Search ........................ 340/324 AD, 747; 235/197

[56] References Cited

U.S. PATENT DOCUMENTS

| | | | |
|---|---|---|---|
| 2,621,246 | 12/1952 | Clayden et al. | 178/5.8 R |
| 2,784,247 | 3/1957 | Hurford | 178/5.8 R |
| 2,847,661 | 8/1958 | Althouse | 340/212 |
| 3,249,796 | 5/1966 | Moffitt | 315/22 |
| 3,375,360 | 3/1968 | Marez | 235/197 |
| 3,476,974 | 11/1969 | Turnage et al. | 235/197 X |
| 3,486,018 | 12/1969 | Warren | 235/197 |
| 3,564,230 | 2/1971 | Carossi | 235/197 |
| 3,659,284 | 4/1972 | Rusch | 340/324 AD |

*Primary Examiner*—David L. Trafton

[57] ABSTRACT

This invention is concerned with generating line symbols (e.g. straight lines, circles) on cathode ray tube displays with TV-type scans. A tube 10 has the normal line and frame deflection waveform generators 12 and 13 and a normal video amplifier 15. A symbol generator 20, 20′, 20″, etc. is provided for each symbol; the generators may be controlled by a computer 21 which defines the parameters of the symbol (e.g. slope and position of a straight line). Each symbol generator contains two waveform generators—line and frame frequency waveform generators synchronised by the line and frame synch pulses LSV and FSV—and a comparator which produces output pulses when the voltages from the two generators are equal. These pulses are fed to the video amplifier 15. The waveforms generated by the two generators are chosen to give the desired symbols; e.g. sawtooths for straight lines, parabolic waveforms for ellipses. The output pulses have substantially vertical leading and trailing edges. Such pulses produce line symbol having rugged edges and this ruggedness increases as the angle the line symbol makes with the raster lines decreases. The pulses are shaped, therefore, so that the duration of the leading and trailing edges vary in the opposite sense to said angle.

9 Claims, 7 Drawing Figures

DISPLAY APPARATUS

This application is a continuation-in-part of U.S. Ser. No. 37,201 Filed May 14, 1970, now abandoned.

The present invention relates to display apparatus, using a cathode ray tube or the equivalent, in which the tube face is scanned in a raster, and concerns means for generating line (cursive) symbols on the face of such a tube.

In displays using cathode ray tubes, various methods have been used for generating line (cursive) symbols on the display. For example, appropriate waveforms have been generated to cause the spot to traverse the required path to form the symbol. This technique has the disadvantage that a time period is needed between successive frames of the raster, and is not usually feasible with electromagnetic deflection systems for the cathode ray tube. Another method which has been used is to scan a plate with the desired symbol on it, by a TV camera or a simplified scanner such as a flying light spot and a photocell, and feed the resulting video signal to the display tube. This has the disadvantage that the symbol can only be varied by changing the plate.

A object of the present invention is to provide a system in which certain line symbols can be generated electronically in a raster.

It has been found that the appearance of a displayed line symbol deteriorates increasingly as the angle the line symbol makes with the raster lines, i.e. the horizontal, decreases.

It is a further object of the invention to produce symbols in which this deterioration in appearance is diminished.

Other objects and a fuller understanding of the invention may be had by referring to the following description and claims taken in conjunction with the accompanying drawings, in which:

Figure 1:
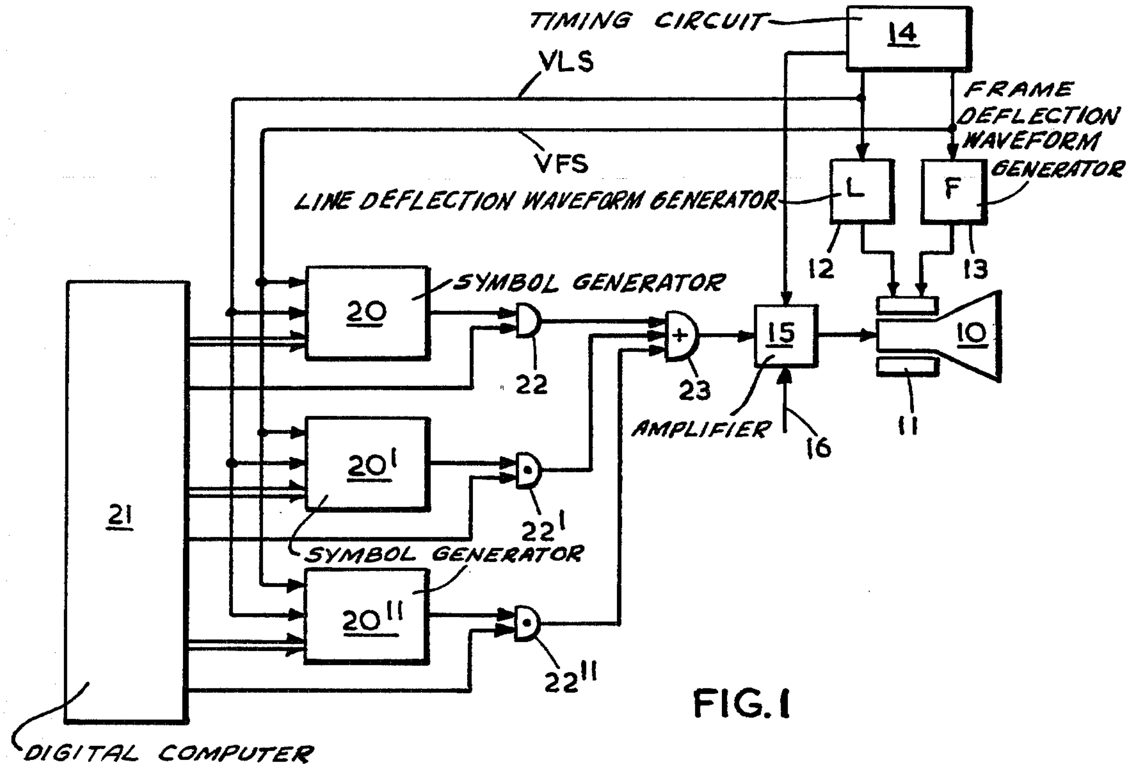
FIG. 1 is a block diagram of the whole apparatus.

Referring to FIG. 1, the apparatus includes a cathode ray tube 10 with deflection coils 11 fed from line and frame deflection waveform generators 12 and 13. A timing circuit 14 generates line and frame synch pulses VLS and VFS, and also feeds fly-back blanking pulses to a video amplifier 15 which feeds the tube 10. Normal video signals to be displayed may be fed via line 16 to the amplifier 15 in the usual way.

The circuitry for displaying line symbols consists essentially of a set of symbol generators 20, 20', 20", etc., each of which is designed to generate a particular type of symbol. These generators are fed with the line and frame synch pulses VLS and VFS, and with parameter information in analog form from digital-to-analog converters in the output interface of a digital computer 21. The computer 21 also generates binary control signals which control analog AND gates 22, 22', 22", etc. These gates are fed from the generators 20, 20', 20", etc. and feed an analog OR gate 23 whose output is in turn fed to the video amplifier 15. The gates 22, 22', 22", etc. may be transistor gates, and the gate 23 may include a diode in each input line to prevent interaction between different waveform generators.

Figure 2:
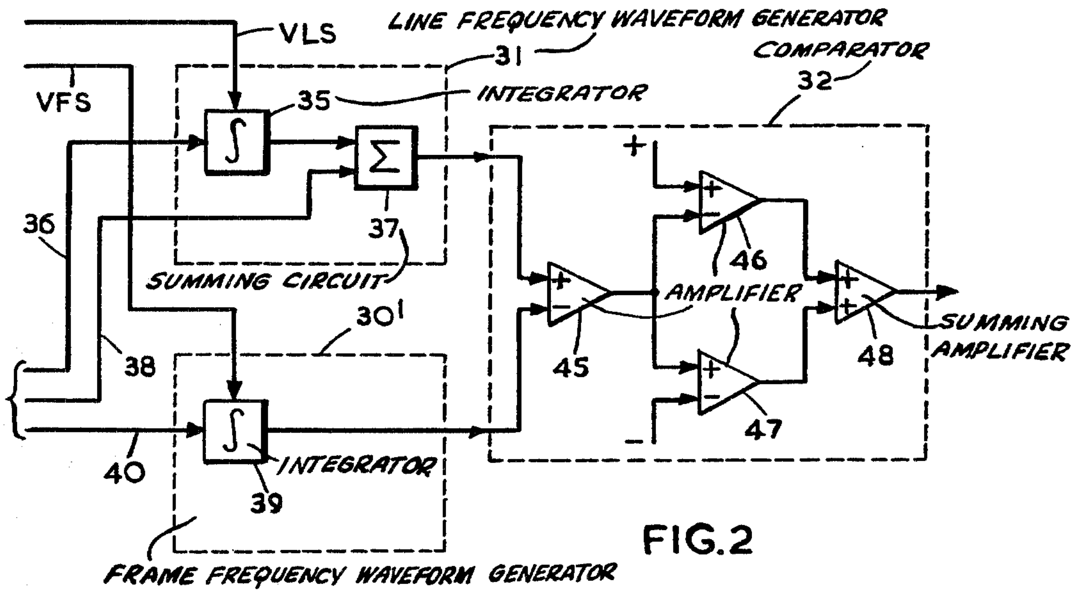
FIG. 2 is a detailed diagram of a waveform generator of FIG. 1.

Referring now to FIG. 2, the symbol generator 20 consists of a line frequency waveform generator 30, a frame frequency waveform generator 31, and a comparator 32 fed by the waveform generators 30 and 31. The waveform generators 30 and 31 are fed with parameter signals, and with the line and frame synch signals VLS and VFS respectively. The outputs from the waveform generators 30 and 31 are compared by the comparator 32, which produces output pulses, when the two voltages are equal, which are fed to the video amplifier 15 as bright-up signals if the gate 22 is selected.

The specific circuitry shown in the blocks 30 to 32 of FIG. 2 is that required for generating straight lines. The line frequency waveform generator 30 consists of an integrator 35, fed with a constant level analog signal on line 36, and feeding a summing circuit 37 which is also fed with a constant level parameter signal on line 38. The frame frequency waveform generator 31 consists of an integrator 39 fed with a constant level analog signal on line 40. The two integrators 35 and 39 are fed with the line and frame synch pulses VLS and VFS respectively, to reset them at the appropriate frequencies, so that repetitive waveforms are generated. The three lines 36, 38, and 40 together constitute the lines which carry the parameter signals. Each integrator may consist of a high-gain inverting amplifier with a capacitor and a transistor connected in parallel between its input and its output, the transistor being turned on to discharge the capacitor and reset the integrator.

Figure 3:
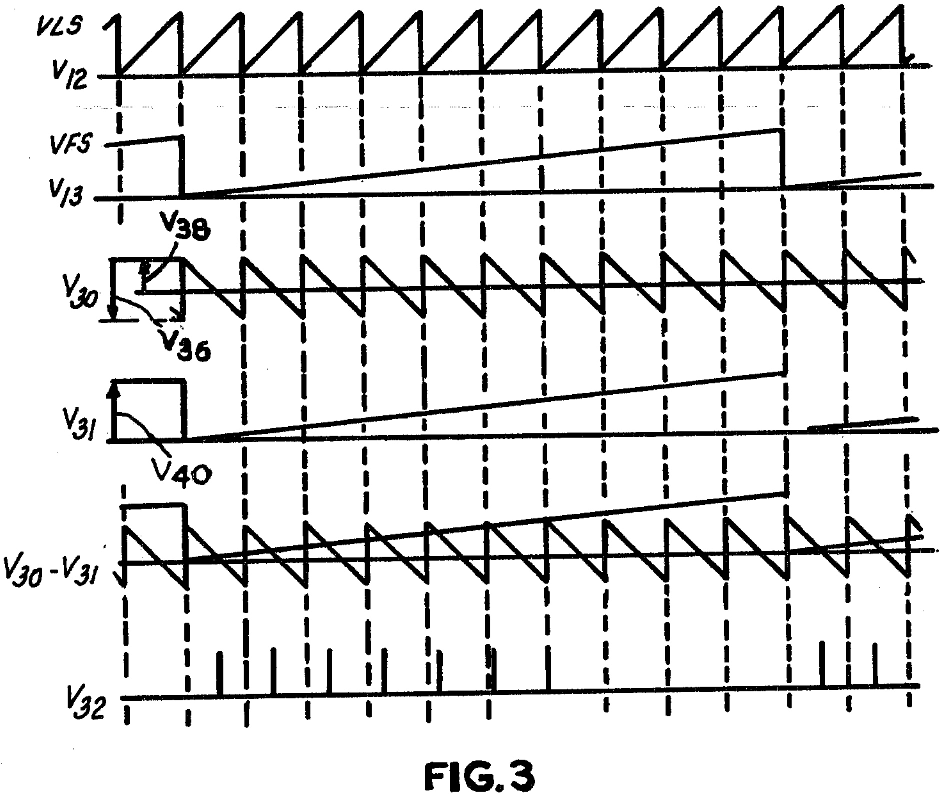
FIG. 3 is a set of waveforms relating to the operation of the apparatus.

The operation of this generator 20 will be described with reference to FIG. 3. The first two waveforms show the tube line and frame deflection waveforms $V_{12}$ and $V_{13}$ respectively. The vertical portions of these two waveforms also represent the line and frame synch signals VLS and VFS respectively. The next waveform, $V_{30}$, is the line frequency waveform generated by generator 30. This is a sawtooth waveform, each sloping portion being generated by the integrator 35 and the slope being determined by the amplitude and polarity of the signal on line 36, the integrator being reset to start again by each line synch pulse. Thus the amplitude of the sawtooth is directly proportional to the voltage $V_{36}$ on line 36; in the diagram, the proportion constant is taken as 1, so that the voltage $V_{36}$ is shown as equal to the amplitude of the sawtooth. The voltage $V_{36}$ is shown as negative, and hence the sawtooth has negative slope. The waveform $V_{30}$ is also displaced from the zero line by the voltage $V_{38}$ on line 38, this being added to the output of the integrator 35 by the summing circuit 37. The waveform $V_{31}$ is produced in a similar way by the integrator 39, which is fed with the voltage $V_{40}$ on line 40.

Figure 4:
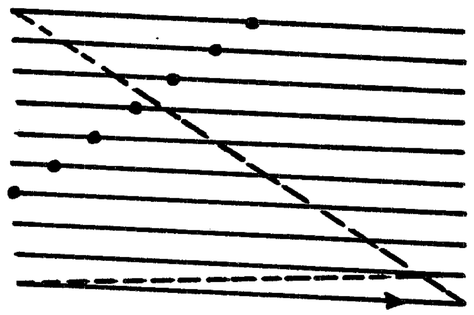
FIG. 4 is a sketch of a raster with a line symbol displayed.

The next line shows the waveforms $V_{30}$ and $V_{31}$ superimposed. These two waveforms are fed to the comparator 32, which produces output pulses (shown as the waveform $V_{32}$) when the instantaneous values of the two input voltages are equal. These pulses are fed via gates 22 and 23 to the video amplifier 15 to produce bright spots on the raster of the tube 10. It is evident from FIG. 3 that the waveforms shown will result in a pulse being produced about midway through the first line scan of each frame, and successively earlier on succeeding lines until the pulse disappears off the end of the line scan. The raster is shown in FIG. 4, with the resulting bright spots on the successive lines emphasized. It is evident that the spots form a line on the raster. For convenience in the drawing, a raster of only ten lines has been shown; but in practice, of course, the number of lines will normally be much greater, typically hundreds, and the bright spots will form an excellent line.

It is thus evident that by using sawtooth waveforms as the line and field frequency waveforms, a straight line may be produced on the raster. By adjusting the voltage on line 38, the line may be moved across the display; and by adjusting the voltages on lines 36 and 40, the line may be rotated to any desired orientation.

Figure 5:
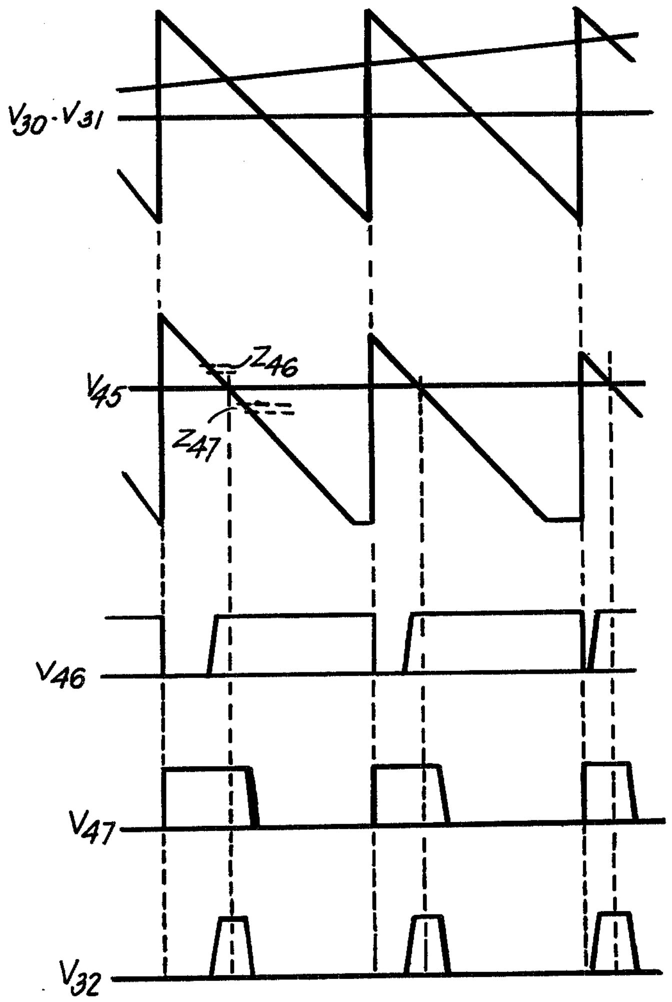
FIG. 5 is a set of waveforms relating to the comparator of the waveform generator of FIG. 2.

The circuitry of the comparator 32 will now be considered in more detail with reference to FIG. 5. The first line of FIG. 5 repeats the waveforms $V_{30}$ and $V_{31}$ from FIG. 4, on a larger scale. These two waveforms are fed to a difference amplifier 45 (FIG. 2) whose output waveform $V_{45}$ is the difference of these two waveforms. Only the portions of this waveform near the zero line are of interest, so that saturation can be tolerated as shown for the larger amplitude portions. The output of amplifier 45 is fed to the negative and positive inputs, respectively, of two amplifiers 46 and 47, both of high gain, so that their outputs are usually saturated. The other inputs of amplifiers 46 and 47 are fed with small positive and negative biases, respectively. Amplifier 46 therefore operates linearly only when the input from amplifier 45 is in the small zone $Z_{46}$ shown in FIG. 5, and saturates for signals outside that zone, so that its output is as shown at waveform $V_{46}$. Similarly amplifier 47 amplifies only in the zone $Z_{47}$, saturating outside that zone, so that its output is as shown at waveform $V_{47}$. The outputs from amplifiers 46 and 47 are combined in a summing amplifier 48 to give a resultant signal as shown at waveform $V_{32}$. This waveform consists of a series of pulses corresponding to the zero crossings of waveform $V_{45}$, i.e. to the equalities of waveforms $V_{30}$ and $V_{31}$.

As mentioned above, the angle the line symbol makes with the raster lines is altered by varying the voltages $V_{36}$ and $V_{40}$. As can be seen from FIG. 5, the gradient of the waveform $V_{45}$ decreases and increases as the angle the line symbol makes with the raster lines decreases and increases. Therefore, the time for which $V_{45}$ lies between the upper limit of zone 246 and the lower limit of zone 247, and therefore the pulse duration varies with variations in the angle the line makes with the raster lines. More specifically, the pulse length increases as said angle decreases.

Similarly, the time for which $V_{45}$ lies in each zone varies. Therefore, the times for the amplifiers 46 and 47 to saturate, and therefore the slopes of the leading and trailing edges of the pulses, vary such that the slopes increase as said angle decreases.

The portion of the pulse duration occupied by the leading and trailing edges is determined by the widths of the zones $Z_{46}$ and $Z_{47}$. These widths are dependent on the bias voltages applied to the amplifiers 46 and 47 and the amplifers themselves. Preferably, the bias voltages and the amplifiers are such that the rising and falling edges are each between 20% and 30% of the pulse duration at half the pulse height as shown in FIG. 5.

With pulses having suitably sloping edges as shown, the bright-up circuitry of the cathode ray tube is controlled so that, at the beginning and end of each segment of the line, the brightness varies progressively to and from full brightness. This varying brightness produced by the sloping edge creates the impression to an observer that the line is substantially continuous.

Although the invention has been described in terms of circuitry for use with an analogue system of generating the bright-up pulses, it is equally applicable to other systems such as a digital system.

Figure 6:
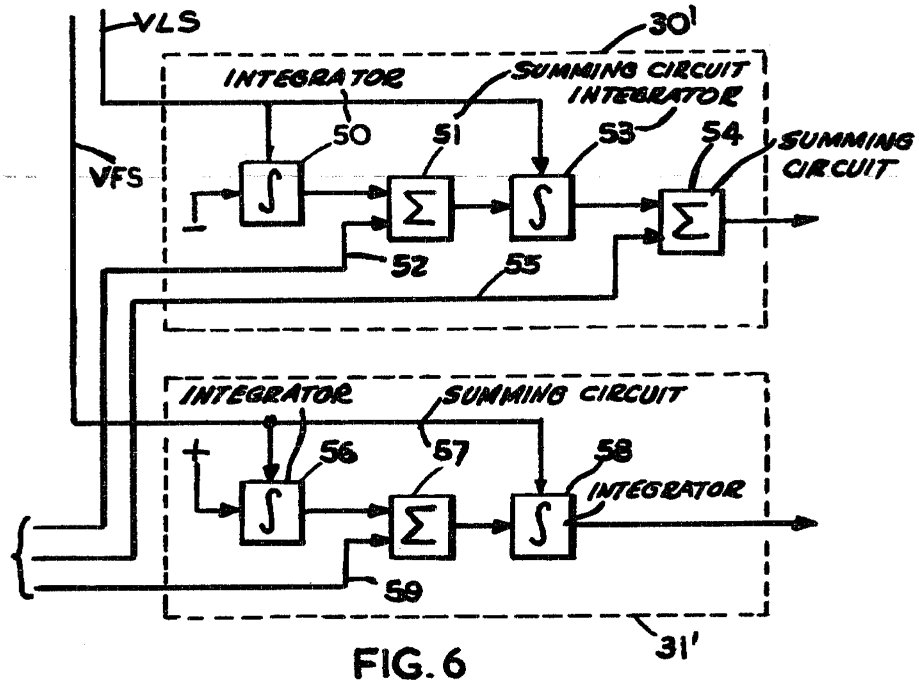
FIG. 6 is a detailed diagram of part of another waveform generator of FIG. 1.
Figure 7:
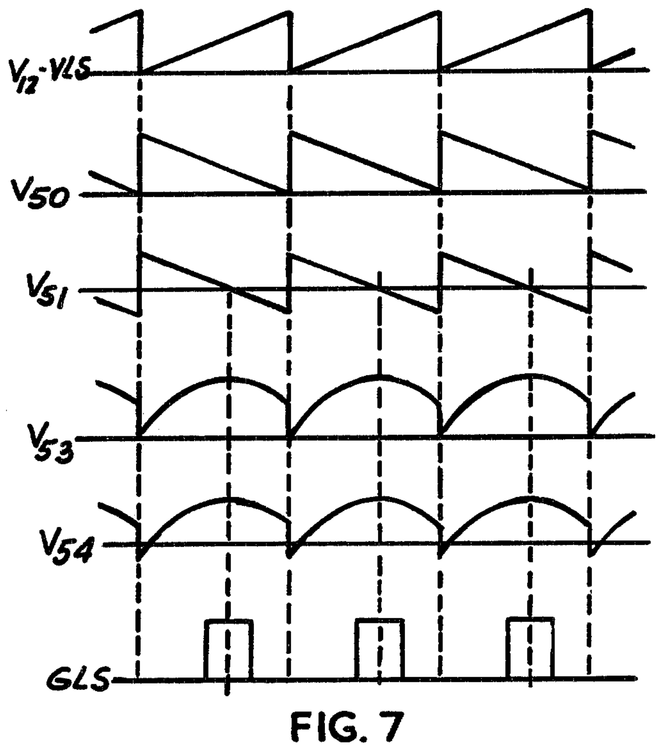
FIG. 7 is a set of waveforms relating to the operation of the waveform generator of FIG. 6.

Referring now to FIGS. 6 and 7, the waveform generators and certain waveforms for a circle line symbol generator 20' are shown. The line frequency waveform generator 30', consists of an integrator 50, fed with a constant voltage; a summing circuit 51, fed with the output of integrator 50 and a constant level analog signal on line 52; a second integrator 53, fed from the summing circuit 51; and a second summing circuit 54, fed with the output of the second integrator 53 and a constant level analog signal on line 55. The two integrators have the line frequency synch signals VLS fed to them to reset them. The waveforms produced in operation are shown in FIG. 7. The first line shows the line scan waveform $V_{12}$ and the line synch pulses VLS; the second line shows the output $V_{50}$ of the integrator 50, this waveform being a sawtooth; the third line shows the output $V_{51}$ of the summing circuit 51, similar to waveform $V_{50}$ apart from the vertical shift; the next line shows the output $V_{53}$ of the second integrator 53, this waveform being a repeated parabolic waveform; and the next line shows the output $V_{30}$, of the second summing circuit 54, this waveform being similar to waveform $V_{53}$ apart from the vertical shift.

The frame frequency waveform generator 31' has a similar circuit, with integrators 56 and 58 and a summing circuit 57, but no counterpart to the second summing circuit is included, and the integrator 56 has a positive input. This circuit produces an output which is similar to waveform $V_{53}$ except that it is of reverse polarity and repeats at frame frequency instead of line frequency.

These two waveforms, from generators 30' and 31', are combined in a comparator (not shown) identical to the comparator 32. The details of this will not be described at great length. However, it can be seen that, over a single cycle of the line frequency waveform $V_{54}$, the frame frequency waveform will be approximately constant, and equality will therefore occur at two instants equally spaced from the peak of waveform $V_{54}$. On successive lines, this frame frequency waveform level will change, first falling and then rising, so that the two instants of equality will first occur simultaneously when the frame frequency waveform level reaches the peak of the line frequency waveform level, and then move apart and then together again as the frame frequency level falls and then rises. The resulting spots on the raster in fact form an ellipse with its axes parallel and perpendicular to the lines of the raster. By suitably adjusting the amplitudes of the two parabolic waveforms, the ellipse can have its two axes made equal, so that it is a circle.

It is evident that adjustment of the voltage on line 52 adjusts the point at which the peak of the waveform $V_{53}$ occurs, and hence produces an X shift (parallel to the raster lines) of the circle. Adjustment of the voltage on line 59 similarly produces a Y shift. It is also evident that by adjustment of the voltage on line 55, the size of the circle can be adjusted.

A modification of the circuitry of FIG. 7 can be made, by using gating signals to drive the integrators 50 and 51, and omitting the summing circuits 51 and 57. The gating signal GLS for the line frequency waveform generator 30' would be as shown in the last line of FIG. 7, this signal being of constant width but of adjustable position inside the line period. The integrator 50 would be adjusted to produce an output sawtooth during the duration of the gating signal which was symmetrical about zero, so that the section of parabolic signal from integrator 53 would have its peak at the centre of the gating pulse. The generator 31' would be modified and operated similarly. This would have the same general effect, but the maximum size of the circle produced would be limited by the size of the gating pulses.

The system described above is capable of generating several different line symbols simultaneously. Of course, if it is desired to generate say several straight lines simultaneously, a corresponding number of identical straight line symbol generators will be used. It will of course be realized that if only one symbol is required at any one time, various economies can be made in the circuitry. For example, the parameter information can be common to the various symbol generators. Thus lines 36, 38 and 40 may be connected to lines 52, 55, and 59; the significance of the voltages on these lines will of course differ for the different symbols. A single comparator 32 can be shared by the different line and frame frequency waveform generators, their outputs being appropriately gated. Further, the waveform generators can be combined to some extent, with internal switching to connect the desired units (integrators, summing circuits, etc.) in the desired order.

If the full system as described above is used, so that several symbols can be displayed together, the gate 22 can be constructed as a summing circuit, if it is desired that where two symbols cross the spot shall be extra bright, or as a doide OR gate, if this is not desired. Any slight pulses which are produced by the symbol generators during the line and frame flyback periods will be blanked out in the usual way by the normal flyback blanking signal from the timing circuit 14 to the video amplifier 15.

The present system also operates well in a system using interlace, in which the interlace is achieved by shifting the phase of the line synch pulses relative to the frame synch pulses for the successive interlaced frames.

Although the waveforms described above are those for generating straight lines and ellipses, it will be realized that other more complicated line symbols can be generated if waveforms of appropriate shape are used.

We claim:

1. Apparatus for displaying line symbols on a screen of a cathode ray comprising:

line and frame deflection waveform generators for scanning the cathode ray tube screen in a raster of lines forming a frame;

a video circuit for the application to the cathode ray tube of signals to control the brightness of the cathode ray tube display;

means for producing control signals defining the position and orientation on the screen of a line symbol required to be displayed;

symbol generating means for producing, under the control of said control signals, a succession of pulses which occur during successive raster lines, each pulse occuring at a time during the corresponding raster line determined by the required position and orientation of the line symbol on the screen (as defined by said control signals) and each pulse having a duration which varies inversely with the required angle of the line symbol with respect to the raster lines; and means for feeding said pulses to the video circuit.

2. Apparatus according to claim 1 in which the pulses produced by the symbol generating means have sloping leading and trailing edges, the duration of said leading and trailing edges varying inversely with the required angle of the line symbol with respect to the raster lines.

3. Apparatus according to claim 1, in which the symbol generating means comprises:

a line frequency waveform generator which generates a repetitive waveform at the line frequency;

a frame frequency waveform generator which generates a repetitive waveform at the frame frequency;

differencing means for producing a waveform corresponding to the difference between the line and frame frequency waveforms; and pulse producing means for producing a pulse each time the difference waveform has a value of zero of a duration which varies inversely with the gradient of said difference waveform.

4. Apparatus according to claim 3 for generating a straight line, wherein the line and frame frequency waveform generators generate sawtooth waveforms, the amplitudes and relative base levels being controllable by said control signals to control the position and orientation of the resulting straight line on the display screen.

5. Apparatus according to claim 4, wherein the line and frame frequency waveform generators each include a respective integrator, for generating the sawtooth waveform, which is reset by pulses from a line or frame synch pulse generator respectively.

6. Apparatus according to claim 3 for generating an ellipse, wherein the line and frame frequency waveform generators generate waveforms of parabolic form the positions of the peaks and the relative base levels being controllable by said control signals to control the position and size of the ellipse on the display screen.

7. Apparatus according to claim 6, wherein the line and frame frequency waveform generators each include two respective integrators connected in series, for generating the parabolic waveforms, and which are reset by pulses from a line or frame synch pulse generator respectively.

8. Apparatus according to claim 3, wherein the differencing means comprises a difference amplifier for forming the difference of the two waveforms, and the pulse producing means comprises saturating amplifiers for amplifying two adjacent narrow zones of the difference waveform and a summing amplifier for forming the sum of the signals representing the amplified zones.

9. Apparatus according to claim 3, wherein there is a plurality of line and frame frequency waveform generators, so that a plurality of line symbols can be generated simultaneously.

* * * * *